(12) United States Patent
Kagawa et al.

(10) Patent No.: US 9,968,975 B2
(45) Date of Patent: May 15, 2018

(54) METHOD AND APPARATUS FOR PRODUCING MICROPOROUS METAL FOIL

(71) Applicant: Seiji Kagawa, Koshigaya-shi, Saitama (JP)

(72) Inventors: Seiji Kagawa, Koshigaya (JP); Yoichiro Kagawa, Koshigaya (JP)

(73) Assignee: Seiji Kagawa, Koshigaya-Shi (JP)

(*) Notice: Subject to any disclaimer, the term of this patent is extended or adjusted under 35 U.S.C. 154(b) by 252 days.

(21) Appl. No.: 14/801,073

(22) Filed: Jul. 16, 2015

(65) Prior Publication Data

US 2016/0107211 A1 Apr. 21, 2016

(30) Foreign Application Priority Data

Oct. 21, 2014 (JP) .................... 2014-214711
Mar. 5, 2015 (JP) .................... 2015-043299

(51) Int. Cl.
*B21B 1/40* (2006.01)
*B21B 27/00* (2006.01)
(Continued)

(52) U.S. Cl.
CPC .............. *B21B 1/40* (2013.01); *B21B 11/00* (2013.01); *B21B 27/005* (2013.01); *B21D 47/04* (2013.01);
(Continued)

(58) Field of Classification Search
CPC .......... B21B 1/227; B21B 1/40; B21B 11/00; B21B 27/005; B21D 31/046; B21D 47/04;
(Continued)

(56) References Cited

U.S. PATENT DOCUMENTS 2,728,703 A * 12/1955 Kiernan .................. B32B 15/08
156/320
2,850,999 A * 9/1958 Kaplan .................... B05D 3/12
156/220
(Continued)

FOREIGN PATENT DOCUMENTS

| JP | 5-131557 A | 5/1993 |
| JP | 9-57860 A | 3/1997 |
| JP | 2002-59487 A | 2/2002 |
| JP | 2011-74468 A | 4/2011 |
| JP | 2011-165637 A | 8/2011 |
| JP | 2012-186142 A | 9/2012 |
| WO | 2008155317 A1 * | 12/2008 ............. B21B 1/227 |

OTHER PUBLICATIONS

Translation WO 2008155317 A1, Dec. 2008.*

*Primary Examiner* — Edward Tolan
(74) *Attorney, Agent, or Firm* — Birch, Stewart, Kolasch & Birch, LLP (57) ABSTRACT

A method and an apparatus for producing a microporous metal foil comprising (a) passing a metal foil through a gap between a pattern roll having large numbers of high-hardness, fine particles on the surface and a hard roll while pressing, to provide the metal foil with large numbers of fine penetrating pores, with a thin hard plastic film interposed between the metal foil and the pattern roll, and a thick soft plastic film interposed between the metal foil and the hard roll; and (b) adjusting tension applied to each of the metal foil, the hard plastic film and the soft plastic film to such an equal level that the metal foil is not broken during forming the fine penetrating pores.

13 Claims, 7 Drawing Sheets

(51) Int. Cl.
*B21B 11/00* (2006.01)
*H01M 4/66* (2006.01)
*H01G 11/68* (2013.01)
*H01G 11/70* (2013.01)
*H01G 11/86* (2013.01)
*B21D 47/04* (2006.01)
*B26F 1/10* (2006.01)
*H01M 4/02* (2006.01)
*H01M 4/74* (2006.01)
*H01M 10/0525* (2010.01)

(52) U.S. Cl.
CPC .............. *B26F 1/10* (2013.01); *H01G 11/68* (2013.01); *H01G 11/70* (2013.01); *H01G 11/86* (2013.01); *H01M 4/661* (2013.01); *H01M 4/742* (2013.01); *H01M 10/0525* (2013.01); *H01M 2004/021* (2013.01); *Y02E 60/13* (2013.01)

(58) Field of Classification Search
CPC ......... B21D 28/26; Y10T 29/18; Y10T 29/30; Y10T 29/302; B26F 1/10; H01M 4/742; H01G 11/86
See application file for complete search history.

(56) References Cited

U.S. PATENT DOCUMENTS

| | | | | |
|---|---|---|---|---|
| 3,718,059 | A | * | 2/1973 | Clayton .................... B26F 1/24 264/154 |
| 5,044,076 | A | * | 9/1991 | Crahay .................. B21B 1/227 29/527.4 |
| 5,111,572 | A | * | 5/1992 | Haiml ...................... B21B 1/38 228/235.2 |
| 5,257,923 | A | | 11/1993 | Karawa |
| 5,415,538 | A | | 5/1995 | Kagawa |
| 5,648,107 | A | * | 7/1997 | Kagawa .................... B26F 1/24 264/284 |
| 7,938,998 | B2 | * | 5/2011 | Kagawa .................. B29C 59/04 264/162 |
| 2012/0040840 | A1 | * | 2/2012 | Okayama ............ H01L 39/2454 505/230 |
| 2012/0219817 | A1 | | 8/2012 | Konishi et al. |
| 2012/0264022 | A1 | | 10/2012 | Hosoe et al. |
| 2015/0114065 | A1 | * | 4/2015 | Kagawa .................. H01M 4/80 72/204 |

* cited by examiner

METHOD AND APPARATUS FOR PRODUCING MICROPOROUS METAL FOIL

FIELD OF THE INVENTION

The present invention relates to a method and an apparatus for efficiently producing a microporous metal foil such as a microporous aluminum foil, etc., suitable for current collectors in lithium-ion batteries, lithium-ion capacitors, electric double-layer capacitors, etc.

BACKGROUND OF THE INVENTION

To provide lithium-ion batteries, lithium-ion capacitors, electric double-layer capacitors, etc. with increased energy densities, current collectors preferably have penetrating pores to reduce positive electrode potential. Aluminum foils are widely used for current collectors, and penetrating pores are formed by various methods.

For example, JP 2011-74468 A discloses a method for producing a high-strength, porous aluminum foil by simultaneously drawing and bending an aluminum foil having large numbers of penetrating pores. The penetrating pores having inner diameters of 0.2-5 μm are formed by subjecting the aluminum foil to DC etching in an electrolyte comprising hydrochloric acid as a main component to form etched pits, and adjusting the diameters of the etched pits by chemical etching. However, because the etched pits have small inner diameters, a sufficient amount of an active material does not enter the penetrating pores, failing to obtain a sufficiently high energy density. In addition, because the formation of penetrating pores by etching suffers low productivity, this method is not suitable for producing a microporous metal foil inexpensively.

JP 2011-165637 A discloses a method for producing a positive current collector, which is provided with a positive active material layer to form a positive electrode of a lithium ion battery, the positive current collector being constituted by an aluminum alloy foil provided with pluralities of pit-like pores on the surface on which the positive active material layer is to be formed, the pores having an average pore diameter of 1.0-5 μm, and a ratio of average pore diameter/average pore depth being 1.0 or less, the method comprising the steps of subjecting the aluminum alloy foil to DC electrolytic etching, and treating the etched aluminum alloy foil with an aqueous organic phosphoric acid solution. However, because pit-like pores formed by DC electrolytic etching have as small an average pore diameter as 5 μm or less, a sufficient amount of an active material does not enter the pit-like pores. Also, like JP 2011-74468 A, this method is not suitable for producing a microporous metal foil at a low cost, because the formation of penetrating pores by etching suffers low productivity.

JP 2012-186142 A discloses a method for producing an electrode for electrochemical devices, which is constituted by pluralities of laminated porous aluminum sheets filled with an active material, comprising the steps of filling each porous aluminum sheet with the active material, compressing it to provide a thin, porous aluminum sheet, and then laminating pluralities of active-material-filled, thin, porous aluminum sheets. The porous aluminum sheet is produced, for example, by forming a coating of a metal forming a eutectic alloy at a temperature equal to or lower than the melting point of Al on a foamed resin having a three-dimensional network structure by plating, vapor deposition, sputtering, CVD, etc., impregnating the foamed resin with a paste comprising Al powder, a binder and an organic solvent as main components, and then heat-treating it in a non-oxidizing atmosphere at a temperature of 550-750° C. However, this porous aluminum sheet is disadvantageous not only in a complicated production method, but also in poor mechanical strength because of the three-dimensional network structure.

Any of the above methods is not suitable for the inexpensive production of a microporous metal foil because of low productivity. To produce a microporous metal foil at a low cost, mass-producing method and apparatus are needed. Thus desired are a method and an apparatus for inexpensively producing a microporous metal foil such as a porous aluminum foil, etc., which has fine penetrating pores sufficient for holding an active material with high mechanical strength, suitable for use in lithium-ion batteries, lithium-ion capacitors, electric double-layer capacitors, etc.

OBJECT OF THE INVENTION

Accordingly, an object of the present invention is to provide a method and an apparatus for producing efficiently and inexpensively a microporous metal foil having sufficient fine penetrating pores to hold an active material, as well as high mechanical strength.

DISCLOSURE OF THE INVENTION

As a result of intensive research in view of the above object, the inventor has found that when large numbers of fine penetrating pores are formed by passing a thin metal foil through a gap between a pattern roll having large numbers of high-hardness, fine particles on the surface and an opposing hard roll while pressing, the metal foil may be broken if the metal foil comes into direct contact with the high-hardness, fine particles; and that however, with a thin hard plastic film interposed between the metal foil and the pattern roll, and a thick soft plastic film interposed between the metal foil and the hard roll, (a) large numbers of penetrating pores can be formed without breaking the metal foil, and (b) cut metal foil pieces or chips generated by forming the pores are attached to the soft plastic film, thereby efficiently producing a microporous metal foil with a high opening ratio. The present invention has been completed based on such findings.

Thus, the method of the present invention for producing a microporous metal foil comprises passing a metal foil through a gap between a pattern roll having large numbers of high-hardness, fine particles on the surface and a hard roll while pressing, to provide the metal foil with large numbers of fine penetrating pores, with a thin hard plastic film interposed between the metal foil and the pattern roll, and a soft plastic film thicker than the hard plastic film interposed between the metal foil and the hard roll; and adjusting tension applied to each of the metal foil, the hard plastic film and the soft plastic film, to such an equal level that the metal foil is not broken during forming the fine penetrating pores.

The apparatus of the present invention for producing a microporous metal foil comprises a pore-forming apparatus comprising a pattern roll having large numbers of high-hardness, fine particles on the surface, and a hard roll opposing the pattern roll via a gap;

a first guide means for passing a metal foil through the gap between the pattern roll and the hard roll;

a second guide means for passing a thin hard plastic film through the gap between the pattern roll and the metal foil; and a third guide means for passing a thicker soft plastic film than the hard plastic film through the gap between the hard roll and the metal foil;

each of the first to third guide means being provided with a means for adjusting tension applied to each of the metal foil, the hard plastic film and the soft plastic film, to such an equal level that the metal foil is not broken during forming the fine penetrating pores;

whereby the hard plastic film, the metal foil and the soft plastic film are overlapped in this order from the side of the pattern roll, and pass through the gap between the pattern roll and the hard roll, to form a microporous metal foil having fine penetrating pores.

In the present invention, the metal foil is preferably as thick as 5-50 µm, the hard plastic film is preferably as thick as 6-20 µm, and the soft plastic film is preferably as thick as 25-300 µm.

In the present invention, the metal foil is preferably an aluminum or copper foil.

In the present invention, the hard plastic film is preferably a polyester film, and the soft plastic film is preferably a polyethylene film.

In the present invention, the hard plastic film preferably has a thin metal film on the side of the metal foil.

In the present invention, the soft plastic film is preferably a composite film comprising a soft resin layer attached to a base film having high tensile strength and hardness. The base film is preferably a polyester film, and the soft resin layer is preferably a polyethylene layer.

In the present invention, a pressing force to the metal foil is preferably 50-600 kgf/cm in terms of linear pressure.

In the present invention, mechanical vibration is preferably applied to at least one of the pattern roll and the hard roll during forming pores in the metal foil. The mechanical vibration preferably has a component perpendicular to the metal foil.

In the present invention, a vibration motor is preferably mounted to a bearing of at least one of the pattern roll and the hard roll, to give mechanical vibration to at least one of the pattern roll and the hard roll during forming the pores in the metal foil. The mechanical vibration preferably has a frequency of 30-1000 Hz.

In the present invention, the pattern roll preferably has large numbers of high-hardness, fine particles having sharp edges and Mohs hardness of 5 or more on the surface. The high-hardness, fine particles preferably have particle sizes in a range of 100-500 µm. The fine particles are preferably attached to the roll surface at an area ratio of 30-80%. The high-hardness, fine particles preferably have aspect ratios in a range of 1-2.

In the present invention, the hard roll is preferably a metal roll or a hard rubber roll.

In the present invention, to remove cut metal foil pieces remaining in edge portions of fine penetrating pores, the microporous metal foil is preferably brought into sliding contact with a buffing roll having such softness as not to break the microporous metal foil.

In the present invention, a pair of smooth-surfaced pressing rolls arranged downstream of the pore-forming apparatus preferably press the microporous metal foil to provide it with a flat surface.

DESCRIPTION OF THE PREFERRED EMBODIMENTS

Though the embodiments of the present invention will be explained in detail referring to the attached drawings, it should be noted that explanation concerning one embodiment is applicable to other embodiments unless otherwise mentioned. Also, the following explanation is not restrictive, and various modifications may be made within the scope of the present invention.

[1] Production Apparatus

Figure 1:
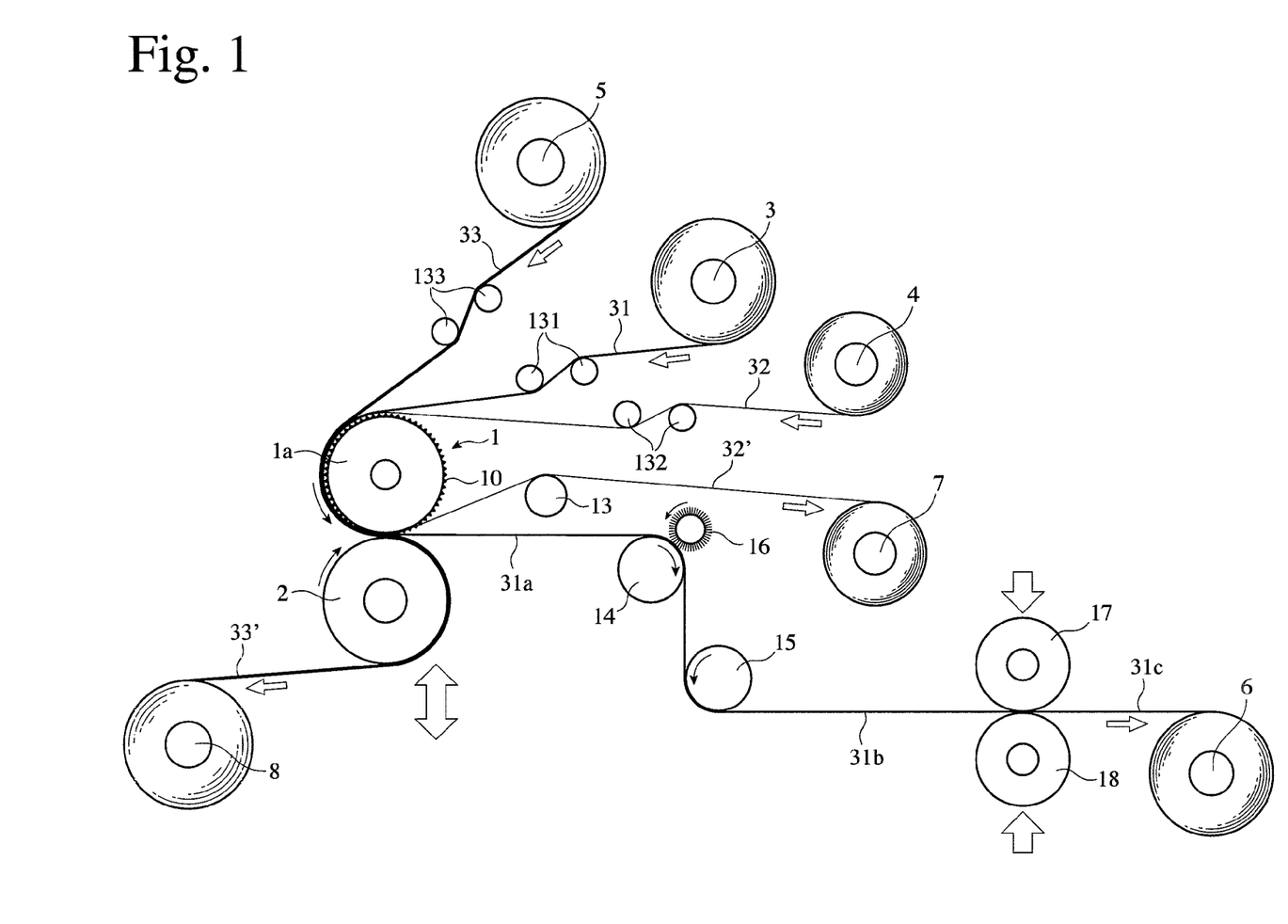
FIG. 1 is a schematic view showing the production apparatus of the present invention.
Figure 2:
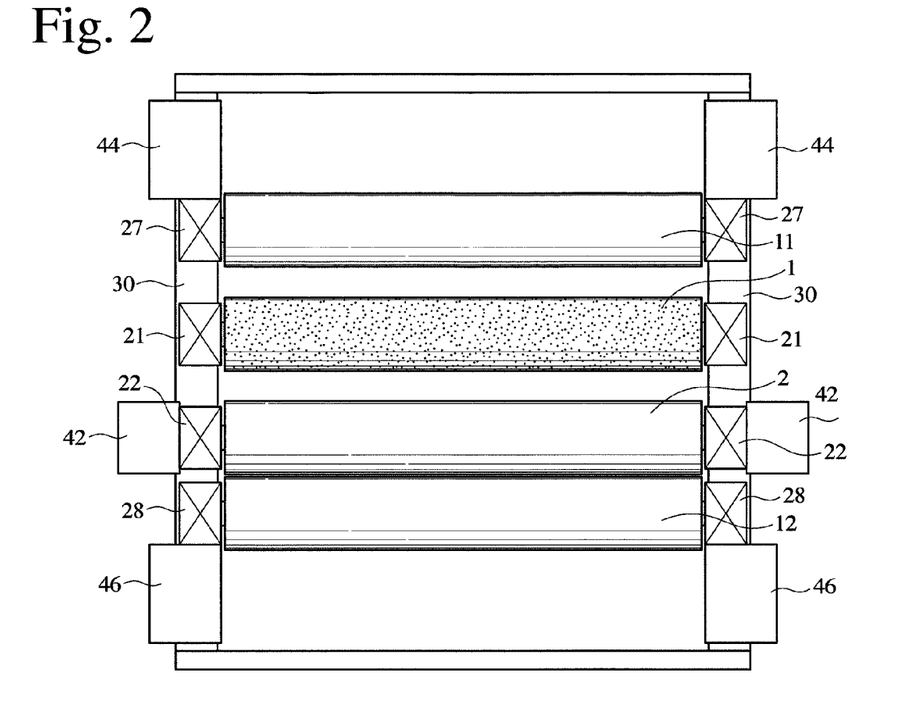
FIG. 2 is a front view showing a pore-forming apparatus in the apparatus shown in FIG. 1.

The apparatus for producing a microporous metal foil, which are shown in FIGS. 1 and 2, comprises a pore-forming apparatus comprising a pattern roll 1, a hard roll 2 and their backup rolls 11, 12, first to sixth reels 3-8, first to third guide rolls 13, 14, 15, a buffing roll 16 opposing the second guide roll 14, and a pair of smooth-surfaced pressing rolls 17, 18. A metal foil 31 is unwound from the first reel 3, and a resultant microporous metal foil 31a is wound around the fourth reel 6. A hard plastic film 32 is unwound from the second reel 4, and a used hard plastic film 32' is wound around the fifth reel 7. A soft plastic film 33 is unwound from the third reel 5, and a used soft plastic film 33' is wound around the sixth reel 8.

One or more rolls 131 constituting a first guide means for the metal foil 31 are arranged between the first reel 3 and a gap of the pattern roll 1 and the hard roll 2, one or more rolls 132 constituting a second guide means for the hard plastic film 32 are arranged between the second reel 4 and the gap of the pattern roll 1 and the hard roll 2, and one or more rolls 133 constituting a third guide means for the soft plastic film 33 are arranged between the third reel 5 and the gap of the pattern roll 1 and the hard roll 2. In order that the metal foil 31, the hard plastic film 32 and the soft plastic film 33 are subject to substantially the same tension, the rolls 131, 132, 133 constituting the first to third guide means may be provided with a precise tension-adjusting function. The precise tension-adjusting function can be obtained, for example, by mounting position-adjusting means to the rolls 131, 132, 133 in the first to third guide means.

(1) Pore-Forming Apparatus

In the pore-forming apparatus shown in FIG. 2, the backup roll 11, the pattern roll 1, the hard roll 2 and the backup roll 12 are arranged in this order from above, and rotatably supported by a pair of frames 30, 30 via bearings 27, 21, 22, 28. The backup rolls 11, 12 may be metal or rubber rolls. In the depicted example, both of the pattern roll 1 and the hard roll 2 are driving rolls, and both bearings 22, 22 of the hard roll 2 are provided with vibration motors 42, 42. The bearings 21, 21 of the pattern roll 1 are mounted to the frames 30, 30, and the bearings 27, 27, 28, 28, 22, 22 of the upper and lower backup rolls 11, 12 and the hard roll 2 are vertically movable along a pair of frames 30, 30. Both bearings 27, 27 of the upper backup roll 11 are provided with driving means 44, 44, and both bearings 28, 28 of the lower backup roll 12 are provided with driving means 46, 46. The upper backup roll 11 pushes down the pattern roll 1, and the lower backup roll 12 pushes up the hard roll 2. The hard roll 2 is pressed by the backup roll 12 to the pattern roll 1 via the soft plastic film 33, the metal foil 31 and the hard plastic film 32. Pushed by the backup rolls 11, 12, the elastic deformation of the pattern roll 1 and the hard roll 2 is prevented during the formation of pores.

(2) Pattern Roll

Figure 3:
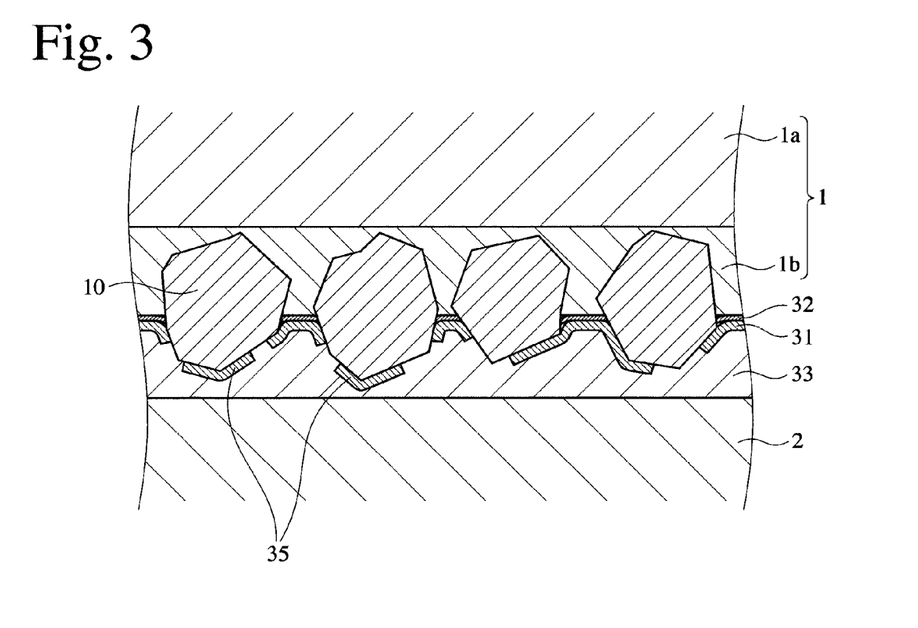
FIG. 3 is an enlarged, partial cross-sectional view showing in detail high-hardness, fine particles, which have penetrated a hard plastic film and a metal foil, and entered a soft plastic film between a pattern roll and a hard roll.

As shown in FIG. 3 in detail, the pattern roll 1 is preferably a roll comprising large numbers of high-hardness, fine particles 10 having sharp edges and Mohs hardness of 5 or more, which are randomly arranged on a roll body 1a. Such preferable rolls are described, for example, in JP 5-131557 A, JP 9-57860 A, and JP 2002-59487 A.

High-hardness, fine particles 10 having sharp edges are preferably fine diamond particles, particularly finely pulverized diamond particles. The particle sizes of the high-hardness, fine particles 10 are preferably 100-600 μm, more preferably 200-500 μm, most preferably 250-400 μm. To form large numbers of fine penetrating pores in the metal foil 31, the particle sizes of the high-hardness, fine particles 10 are preferably as uniform as possible. To this end, the high-hardness, fine particles 10 are preferably classified. The area ratio of high-hardness, fine particles 10 on the pattern roll 1 (percentage of high-hardness, fine particles 10 on the roll surface) is preferably 30-80%, more preferably 50-80%. The high-hardness, fine particles 10 are fixed to the roll body 1a by a nickel plating layer 1b, etc.

To prevent the deformation of the pattern roll 1 during forming pores in the metal foil 31, the roll body 1a of the pattern roll 1 is preferably formed by a hard metal. The hard metal may be die steel such as SKD11.

(3) Hard Roll

The hard roll 2 opposing the pattern roll 1 has a smooth roll surface. It may be a metal roll or a hard rubber roll, as long as it has such hardness as to avoid its roll surface from being deformed during forming pores in the metal foil 31. The hard roll 2 is also preferably formed by a hard metal such as die steel to avoid deformation during forming pores. In the case of the hard rubber roll, it preferably has Shore A hardness of 80-95.

(4) Buffing Roll

The as-formed microporous metal foil 31a has not only perfect penetrating pores without burrs (cut pieces attached to their edge portions), but also penetrating pores with burrs remaining in the edge portions. Some burrs attached to edge portions may be detached in subsequent steps, adversely affecting lithium-ion batteries, capacitors, etc. To avoid such problems, easily detachable burrs are preferably removed in advance. To this end, as shown in FIG. 1, the as-formed microporous metal foil 31a is preferably caused to pass through the gap between the guide roll 14 and a buffing roll 16 opposing the guide roll 14, with the buffing roll 16 having a higher rotating speed than a running speed of the microporous metal foil 31a, to carry out buffing for removing burrs. In order that the microporous metal foil 31a is not broken in a step of removing burrs, the material and rotating speed of the buffing roll 16 should be adjusted. To this end, for example, it is preferable to rotate a buffing roll 16 having such soft fibers as to avoid the breakage of the microporous metal foil 31a, at such a speed as to avoid the breakage of the microporous metal foil 31a.

(5) Pressing Roll

Because even the buffed microporous metal foil 31b has burrs firmly remaining in the edge portions of some penetrating pores, it is apparently thicker than the original metal foil 31. When a thin microporous metal foil is demanded, the microporous metal foil 31b is pressed to make burrs of the penetrating pores flat. The microporous metal foil 31b is pressed preferably by a pair of smooth-surfaced pressing rolls 17, 18. Each pressing roll 17, 18 is preferably formed by a hard metal. Pressing makes burrs remaining in the edge portions of penetrating pores flat, providing a thinner microporous metal foil 31c (having substantially the same thickness as that of the metal foil 31) than the microporous metal foil 31b. The flattened burrs partially cover penetrating pores in the pressed microporous metal foil 31c, resulting in a slightly decreased opening ratio.

[2] Production Method (1) Metal Foil

The metal foil 31 to be provided with pores is preferably an aluminum foil, a copper foil or a stainless steel foil. Particularly, the aluminum foil can be used for current collectors in lithium-ion batteries, lithium-ion capacitors, electric double-layer capacitors, etc., and the copper foil can be used for negative or positive electrodes in lithium-ion batteries, lithium-ion capacitors, etc. The apparatus of the present invention may be used to form pores in a metal foil 31 as thick as about 5-50 μm. To use the microporous metal foil 31 suitably for current collectors of lithium-ion batteries, etc., the upper limit of the thickness of the metal foil 31 is preferably 40 μm, more preferably 30 μm, most preferably 25 μm. The lower limit of the thickness of the metal foil 31 may be practically 10 μm.

(2) Hard Plastic Film

The hard plastic film 32 interposed between the pattern roll 1 and the metal foil 31 should meet the following conditions: (a) it is not expanded even by tension applied to the metal foil 31 to be provided with pores; (b) it has such high tensile strength and hardness as not to permit deformation even when the high-hardness, fine particles 10 penetrate through it, as well as proper thickness; and (c) it has such softness and thickness as to permit the pressed high-hardness, fine particles 10 to easily penetrate it. Accordingly, the hard plastic film 32 is preferably formed by flexible thermoplastic polymers such as polyesters [polyethylene terephthalate (PET), etc.], polyamides [nylons (Ny), etc.], oriented polypropylene (OPP), etc.

The thickness of the hard plastic film 32 may be properly determined depending on the type of hard plastics, to meet the above conditions (a)-(c). For example, when the hard plastic film 32 is made of PET, its thickness is preferably 6-20 μm. To include other hard plastics, the thickness of the hard plastic film 32 may be generally about 5-30 μm. A hard plastic film 32 thinner than 5 μm does not have sufficient tensile strength, so that it is deformed by tension applied to the metal foil 31 and by stress during forming pores, likely causing the breakage of the metal foil 31. On the other hand, when the hard plastic film 32 is thicker than 30 μm, the high-hardness, fine particles 10 cannot easily penetrate the hard plastic film 32, failing to form penetrating pores at a high density in the metal foil 31. The preferred thickness of the hard plastic film 32 is 8-15 μm.

To be easily peelable from the as-formed microporous metal foil 31a, the hard plastic film 32 is preferably provided with a thin metal film on the metal foil side. The thin metal film is preferably made of aluminum, nickel, titanium, carbon, etc., and a thin aluminum film is more preferable from the aspect of low cost. As long as the microporous metal foil 31a can be easily peeled, the thickness of the thin metal film is not restrictive. The thin metal film may be formed by a physical vapor deposition method, a sputtering method, a chemical vapor deposition method, etc.

(3) Soft Plastic Film

When passing through the gap between the pattern roll 1 and the hard roll 2, the soft plastic film 33 is positioned outside the metal foil 31 (opposite side to the hard plastic film 32), and interposed between the metal foil 31 and the hard roll 2. Accordingly, the soft plastic film 33 should have not only (a) such softness and thickness that the high-hardness, fine particles 10 penetrating the hard plastic film 32 and the metal foil 31 can enter or intrude; but also (b) such strength and hardness that a pressing force necessary for the high-hardness, fine particles 10 to penetrate the metal foil 31 can be transmitted from the hard roll 2. Such soft plastic film 33 is preferably made of soft thermoplastic polymers such as polyolefins, soft polyvinyl chloride, etc. The polyolefins include low-density polyethylene (LDPE), linear low-density polyethylene (LLDPE), high-density polyethylene (HDPE), cast polypropylene (CPP), ethylene-vinyl acetate copolymers (EVAc), etc.

The soft plastic film 33 is preferably as thick as 30-300 μm. When the soft plastic film 33 is thinner than 30 μm, the high-hardness, fine particles 10 penetrating the hard plastic film 32 and the metal foil 31 also penetrate the soft plastic film 33, likely contacting the hard rubber roll 2. On the other hand, when the soft plastic film 33 is thicker than 300 μm, the soft plastic film 33 is deformed too much when pores are formed in the metal foil 31, so that the metal foil 31 may be broken. The thickness of the soft plastic film 33 is more preferably 40-250 μm, most preferably 50-200 μm.

The soft plastic film 33 is preferably a composite film having a layer of a soft resin such as LLDPE or EVAc (sealant layer) on a base film having high tensile strength and hardness, such as PET or OPP. The base film may be made of the same material as that of the hard plastic film 32. The material of the sealant layer may be the same as that of the soft plastic film 33. The sealant layer is preferably as thick as 20-200 μm. When the hard roll 2 is a metal roll, the sealant layer is preferably as thick as 100-200 μm. When the hard roll 2 is a hard rubber roll, the sealant layer is preferably as thick as 20-100 μm. When the soft plastic film 33 is a composite film, the sealant layer is on the side of the metal foil 31.

(4) Tension

When tension applied to the metal foil 31 is larger than tensions applied to the hard plastic film 32 and the soft plastic film 33 in the formation of penetrating pores in the metal foil 31 by the pattern roll 1 and the hard roll 2, the metal foil 31 is broken because of excessive stress. On the other hand, when tension applied to the metal foil 31 is smaller than tensions applied to the hard plastic film 32 and the soft plastic film 33, the metal foil 31 is wrinkled. Accordingly, the metal foil 31, the hard plastic film 32 and the soft plastic film 33 should be subjected to substantially the same tension. The term "substantially the same tension" used herein means that the metal foil 31, the hard plastic film 32 and the soft plastic film 33 need not be subjected to completely the same tension, but they may be subjected to such close tensions as to sufficiently avoid the breakage and wrinkling of the metal foil 31 in the entire pore-forming process of the metal foil 31 (from the contact of the metal foil 31 with the pattern roll 1 to the peeling of the hard plastic film 32 and the soft plastic film 33).

To apply substantially the same tension to the metal foil 31, the hard plastic film 32 and the soft plastic film 33, the shafts of the guide rolls 131, 132, 133 are provided with tension-sensing means (not shown) and position-adjusting means (not shown), and the positions of the guide rolls 131, 132, 133 are adjusted based on the sensed tensions, so that the sensed tensions become equal. Thus, the guide rolls 131, 132, 133 can act as precise tension-adjusting rolls.

(5) Pore-Forming Method

As shown in FIG. 1, the hard plastic film 32, the metal foil 31 and the soft plastic film 33 are brought into contact with the pattern roll 1 in this order from the pattern roll 1. Any of the hard plastic film 32, the metal foil 31 and the soft plastic film 33 comes into contact with the pattern roll 1 preferably upstream of a gap between the pattern roll 1 and the hard rubber roll (pressing position of the metal foil 31). Of course, the hard plastic film 32, the metal foil 31 and the soft plastic film 33 may be overlapped with substantially the same tension by other rolls (not shown), and then caused to pass through the gap between the pattern roll 1 and the hard rubber roll.

When the hard plastic film 32, the metal foil 31 and the soft plastic film 33 in an overlapped state pass through the gap between the pattern roll 1 and the hard roll 2 while pressing, as shown in FIG. 3, the high-hardness, fine particles 10 on the pattern roll 1 penetrate the hard plastic film 32 and then the metal foil 31, and further enter or intrude into the soft plastic film 33. Cut pieces 35 of the metal foil 31 generated by the formation of penetrating pores are detached from the edge portions of the penetrating pores and embedded in the soft plastic film 33, or remain partially attached to the edge portions of the penetrating pores. Though the high-hardness, fine particles 10 have a particle size distribution, the high-hardness, fine particles 10 entering the soft plastic film 33 do not reach the hard roll 2 because the soft plastic film 33 is sufficiently thick.

To form large numbers of penetrating pores in the metal foil 31, a pressing force to the pattern roll 1 is preferably 50-600 kgf/cm in terms of linear pressure. The pressing force is a value obtained by dividing a load applied to both shafts of the pattern roll 1 by the width of the metal foil 31. For example, when a load of 3 tons+3 tons is applied to both shafts of the pattern roll 1 to form pores in the metal foil 31 having a width of 30 cm, the pressing force is (3000+3000)/30=200 kgf/cm. When the pressing force applied to the pattern roll 1 is less than 50 kgf/cm, sufficient numbers of penetrating pores are not formed. On the other hand, when the pattern roll 1 is subject to a pressing force of more than 600 kgf/cm, the metal foil 31 may be broken. The more preferred pressing force is 100-400 kgf/cm.

Because the soft plastic film 33 has sufficiently large compression resistance, it is not deformed by compression exerted by the high-hardness, fine particles 10 entering the soft plastic film 33. Accordingly, the high-hardness, fine particles 10 form clear-edge penetrating pores in the metal foil 31, without wrinkling or breaking the metal foil 31.

(6) Vibration

It has been found that when the pattern roll 1 and the hard roll 2 are mechanically vibrated in the formation of penetrating pores in the metal foil 31 by the high-hardness, fine particles 10 of the pattern roll 1, (a) the high-hardness, fine particles 10 deeply enter the metal foil 31, resulting in larger numbers of penetrating pores with a larger average pore diameter; and (b) cut pieces (burrs) 35 generated by the formation of penetrating pores are attached to the soft plastic film 33, so that the burrs tend to be detached from the metal foil 31 when the soft plastic film 33 is peeled from the metal foil 31, resulting in a microporous metal foil 31a with few burrs in the edge portions of penetrating pores. The mechanical vibration should have at least a component perpendicular to the metal foil 31 (a component in a direction of the high-hardness, fine particles 10 of the pattern roll 1 penetrating the metal foil 31).

Vibration applied to the pattern roll 1 and the hard roll 2 can be obtained from vibration motors mounted to both bearings of the pattern roll 1 or both bearings of the hard roll 2. In the example shown in FIG. 2, vibration motors 42, 42 are mounted to both bearings 22, 22 of the hard roll 2. In any case, such mechanical vibration is preferably on such a level as to vigorously vibrate both of the pattern roll 1 and the hard roll 2.

In the example shown in FIG. 2, the vibration motor 42 has a structure which generates vibration by the rotation of an unbalanced weight fixed to a rotation shaft of the motor. Accordingly, when the vibration motors 42, 42 are mounted to both bearings 22, 22 of the hard roll 2, with the rotation shaft of each vibration motor 42 in parallel with a rotation shaft of the hard roll 2, the generated vibration has a component perpendicular to a gap between the pattern roll 1 and the hard roll 2 (in a direction of pushing the high-hardness, fine particles 10 of the pattern roll 1 perpendicularly to the metal foil 31). Usable as such a vibration motor 42 is, for example, Uras Vibrator available from Uras Techno Co. Ltd. The frequency of vibration may be in a range of 30-1000 Hz.

It may be considered that the above effects (a) and (b) are obtained by vibration, because mechanical vibration given to the high-hardness, fine particles 10 of the pattern roll 1 pushing the metal foil 31 causes the high-hardness, fine particles 10 to act like having more sharp edges, thereby making it easier to detach burrs 35 from the metal foil 31. To exhibit such function, the pattern roll 1 and the hard roll 2 are preferably vibrated entirely. High-power vibration given to the pattern roll 1 and the hard roll 2 cannot be obtained, for example, by ultrasound vibration, because of insufficient energy.

(7) Peeling of Microporous Metal Foil

The metal foil 31 passing the pattern roll 1 and the hard roll 2 while pressing is turned to a microporous metal foil 31a having fine pores. The used hard plastic film 32' and the used soft plastic film 33' are peeled from the microporous metal foil 31a leaving the pattern roll 1 and the hard roll 2. The used hard plastic film 32' passes the first guide roll 13 and is wound around the fifth reel 7, and the used soft plastic film 33' passes the hard roll 2 and is wound around the sixth reel 8.

Because the used hard plastic film 32' is not substantially subjected to deformation such as stretching, etc., it is easily peeled from the as-formed microporous metal foil 31a. Also, when the used soft plastic film 33' is peeled from the as-formed microporous metal foil 31a, cut pieces (burrs) 35 of the metal foil 31 are detached from the edge portions of penetrating pores. Of course, burrs relatively strongly attached to the edge portions of penetrating pores remain in the as-formed microporous metal foil 31a after peeling the used soft plastic film 33'. As a result, the microporous metal foil 31a is apparently slightly thicker than the original metal foil 31, because burrs are partially attached to the edge portions of penetrating pores.

(8) Buffing

With a buffing roll 16 opposing the second guide roll 14 downstream of the pattern roll 1 and the hard roll 2 rotating at a higher speed than the moving speed of the microporous metal foil 31a, the as-formed microporous metal foil 31a preferably passes through the gap between the buffing roll 16 and the second guide roll 14, to carry out buffing to remove easily detachable burrs 35 from the edge portions of penetrating pores of the metal foil 31. Of course, buffing may be omitted as the case may be.

The buffing roll 16 is preferably a roll-shaped brush of plastic fibers, natural fibers, etc. The brush should have such softness that the microporous metal foil 31a is not broken in a process of removing burrs 35 from the edge portions of penetrating pores of the metal foil 31. Because burrs 35 are not detached from the buffed microporous metal foil 31b in subsequent steps, the microporous metal foil exhibits stable quality when used for lithium-ion batteries, lithium-ion capacitors, etc.

(9) Pressing

Because burrs are partially attached to the edge portions of penetrating pores, the microporous metal foil 31b is apparently thicker than the original metal foil 31. Accordingly, the microporous metal foil 31b is preferably pressed, if necessary, to obtain a microporous metal foil 31c having the original thickness. Of course, for example, when pressing is conducted after coating a positive electrode material in lithium-ion batteries, the pressing step of the microporous metal foil 31b may be omitted. Because the microporous metal foil 31b formed by a thin foil of aluminum or copper is extremely soft, the pressing of the microporous metal foil 31b should be carried out with such a pressing force that burrs 35 can be flattened without breaking the microporous metal foil 31b. A specific pressing pressure may be determined depending on the material and thickness of the metal foil 31.

[3] Microporous Metal Foil

A microporous metal foil obtained by the present invention has large numbers of penetrating pores, a high percentage of which have edge portions free from burrs. For example, when penetrating pores are formed in a metal foil 31 as thick as 5-50 μm sandwiched by a hard plastic film 32 as thick as 6-20 μm and a soft plastic film 33 as thick as 30-300 μm under a pressing force of 50-600 kgf/cm, using a diamond roll 1 having fine diamond particles 10 having particle sizes of 100-600 μm at an area ratio of 30-80% on the surface, the resultant penetrating pores have diameters substantially in a range of 50-150 μm, and about 20% or more of the penetrating pores are free from burrs. However, because some penetrating pores have burrs attached to their edge portions, the area ratio of penetrating pores in the microporous metal foil 31a may be properly evaluated by light transmittance. The light transmittance (%) is a ratio ($I/I_0 \times 100$) of light I transmitting the microporous metal foil 31a to incident light $I_0$ having a wavelength of 660 nm. Though variable depending on production conditions, the microporous metal foil 31a produced by the present invention has light transmittance of generally 2-10%, preferably 3-6.5%.

The present invention will be explained in more detail referring to Examples below without intention of restricting the present invention thereto.

Example 1

A pattern roll 1 comprising fine diamond particles 10 having a particle size distribution of 250-350 µm and attached to an SKD11-made roll having an outer diameter of 200 mm with a nickel plating, and an SKD11-made hard roll 2 having an outer diameter of 200 mm were mounted to a pore-forming apparatus shown in FIG. 2, and vibration motors (Uras Vibrator KEE-6-2B available from Uras Techno Co. Ltd.) 32, 32 were mounted to both bearings 22, 22 of the hard roll 2. A rotation shaft of each vibration motor 42 was in parallel with a rotation shaft of the hard roll 2. This vibration motor has a structure generating vibration by the rotation of an eccentric weight, and vibration (perpendicular to a gap between both rolls 1, 2) given to the rotating hard roll 2 had a frequency of 120 Hz.

Using a 12-µm-thick Al foil as a metal foil 31, a 12-µm-thick PET film with Al vapor-deposited on one surface as a hard plastic film 32, and a composite film constituted by a 60-µm-thick LLDPE layer and a 12-µm-thick PET layer as a soft plastic film 33, pores were formed in the Al foil 31 by the apparatus shown in FIG. 1. Passing through the gap between both rotating rolls 1, 2 under a pressing force (linear pressure) of 233 kgf/cm, and at a speed of 1.5 m/second, were the Al-deposited PET film 32 (a vapor-deposited Al layer on an opposite side to the pattern roll 1), the Al foil 31, and the LLDPE/PET composite film 33 (the LLDPE layer on the side of the Al foil 31) in this order from the roll 1. In this process, the same tension (load per 1-cm-width) of 0.1 kgf/cm was applied to any of the Al foil 31, the Al-deposited PET film 32 and the LLDPE/PET composite film 33.

A used hard plastic film 32' and a used soft plastic film 33' were peeled from the as-formed microporous Al foil 31a, which passed a gap between both rolls 1, 2. The resultant microporous Al foil 31a was free from defects such as breakage, wrinkles, etc.

Figure 4:
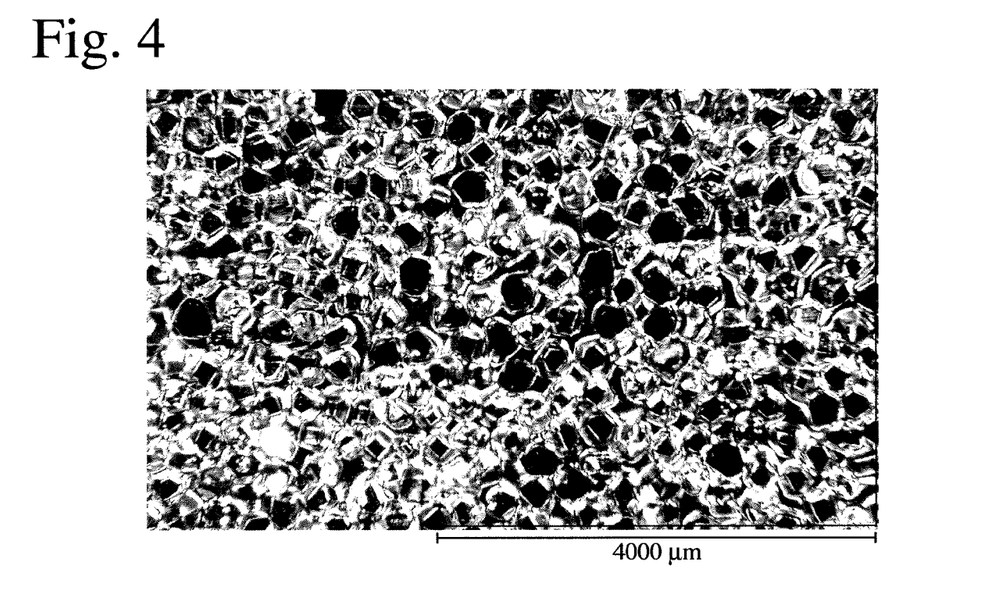
FIG. 4 is an optical photomicrograph (50 times) of the microporous aluminum foil of Example 1.
Figure 5:
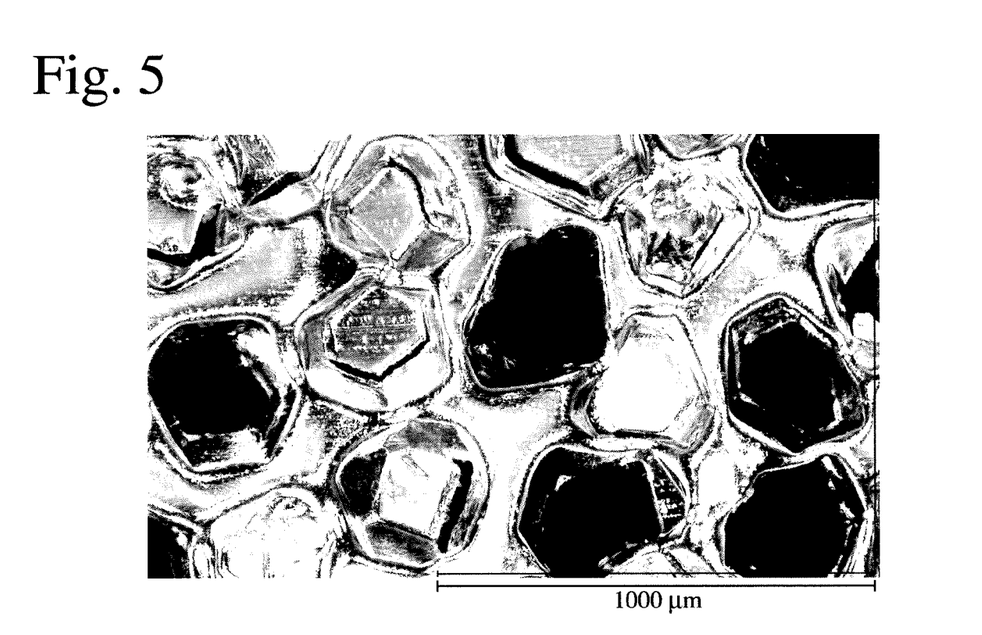
FIG. 5 is an optical photomicrograph (200 times) of the microporous aluminum foil of Example 1.

The optical photomicrographs (50 times and 200 times) of the microporous Al foil 31a of Example 1 are shown in FIGS. 4 and 5. As is clear from FIGS. 4 and 5, the microporous Al foil 31a of Example 1 had large numbers of penetrating pores having uniform diameters, with a pore diameter distribution of substantially 150-200 µm. The percentage of perfect penetrating pores free from burrs attached to edge portions was about 20% or more. The microporous Al foil 31a had light transmittance of 5%.

Comparative Example 1

A microporous aluminum foil 31a was produced by the apparatus shown in FIGS. 1 and 2 in the same manner as in Example 1, except that the hard plastic film 32 was not interposed between the aluminum foil 31 and the pattern roll 1. As a result, the aluminum foil 31 was broken during forming pores.

Comparative Example 2

A microporous aluminum foil 31a was produced in the same manner as in Example 1, except that the soft plastic film 33 was not interposed between the aluminum foil 31 and the hard roll 2. Because the fine diamond particles 10 came into contact with the hard roll 2, extremely small numbers of penetrating pores were formed in the aluminum foil 31.

Comparative Example 3

Though it was tried to form pores in the aluminum foil 31 by the pattern roll 1 and the hard roll 2 without using the hard plastic film 32 and the soft plastic film 33, the aluminum foil 31 was broken with only few penetrating pores.

Example 2

A microporous copper foil 31a was produced in the same manner as in Example 1, except for (1) using a 12-µm-thick copper foil in place of the aluminum foil, (2) changing the pressing force to 333 kgf/cm, and (3) changing the frequency of vibration given to the hard roll 2 to 60 Hz. A used hard plastic film 32' and a used soft plastic film 33' were peeled from the as-formed microporous copper foil 31a, which passed a gap between both rolls 1, 2. The resultant microporous copper foil 31a was free from defects such as breakage, wrinkles, etc.

Figure 6:
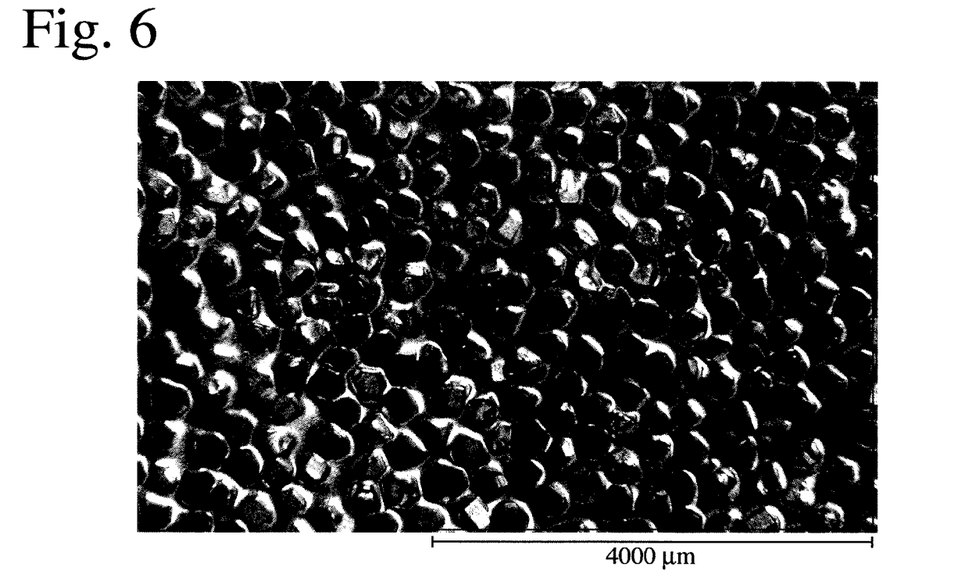
FIG. 6 is an optical photomicrograph (50 times) of the microporous copper foil of Example 2.
Figure 7:
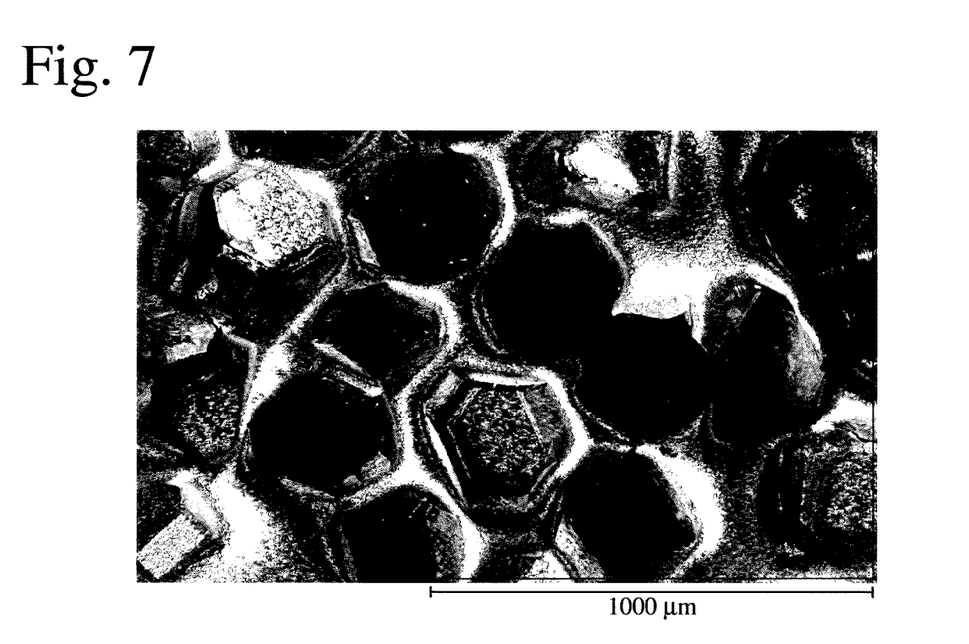
FIG. 7 is an optical photomicrograph (200 times) of the microporous copper foil of Example 2.
Figure 8:
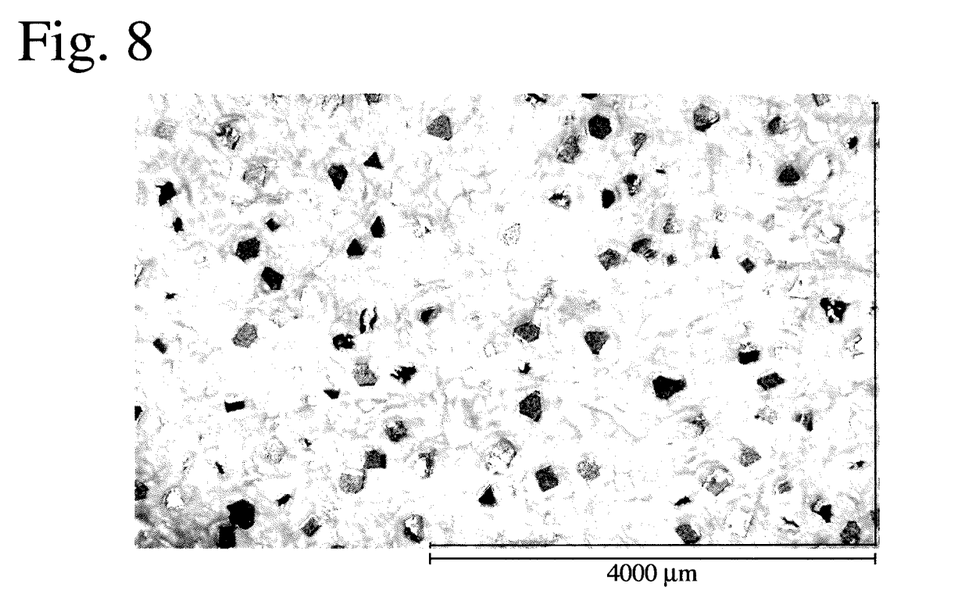
FIG. 8 is an optical photomicrograph (50 times) of the used soft plastic film of Example 2.

The optical photomicrographs (50 times and 200 times) of the microporous copper foil 31a of Example 2 are shown in FIGS. 6 and 7, and the optical photomicrograph (50 times) of the used soft plastic film 33' is shown in FIG. 8. As is clear from FIGS. 6 and 7, the microporous copper foil 31a of Example 2 had large numbers of penetrating pores having uniform sizes, with a pore diameter distribution of substantially 150-200 µm. The percentage of perfect penetrating pores free from burrs attached to edge portions was about 30%. The microporous copper foil 31a had light transmittance of 7%.

As is clear from FIG. 8, large numbers of cut pieces of the copper foil 31 generated by forming the penetrating pores were attached to the used soft plastic film 33'. This indicates that many cut pieces of the copper foil 31 generated by forming the penetrating pores are trapped by the soft plastic film 33.

Example 3

A microporous copper foil 31a was produced in the same manner as in Example 2, except for changing the pressing force to 300 kgf/cm. A used hard plastic film 32' and a used soft plastic film 33' were peeled from the as-formed microporous copper foil 31a, which passed a gap between both rolls 1, 2. The resultant microporous copper foil 31a was free from defects such as breakage, wrinkles, etc.

Figure 9:
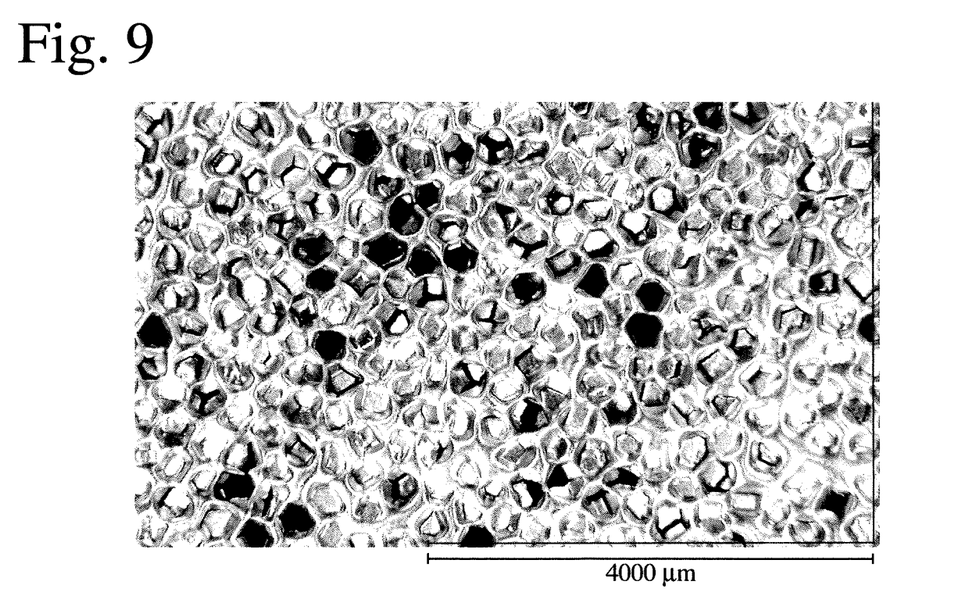
FIG. 9 is an optical photomicrograph (50 times) of the microporous copper foil of Example 3.
Figure 10:
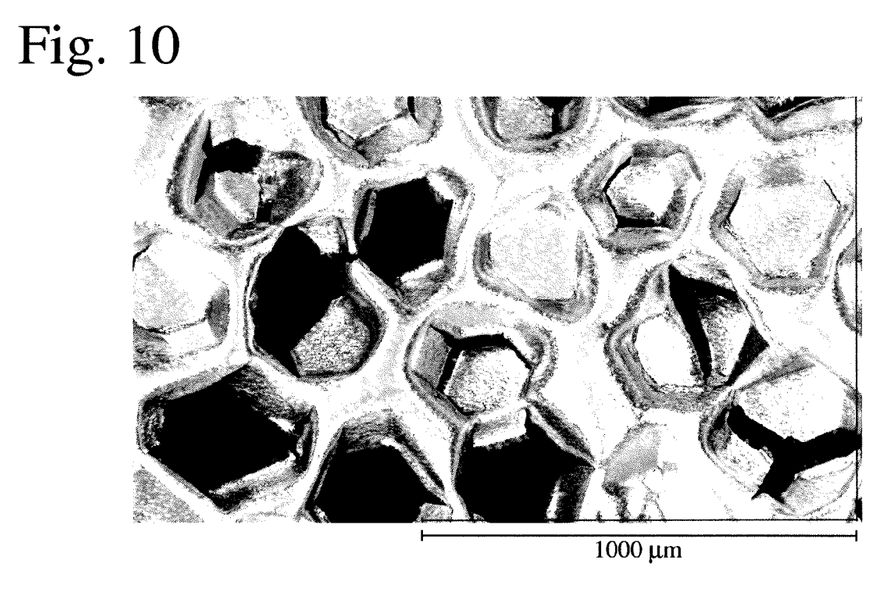
FIG. 10 is an optical photomicrograph (200 times) of the microporous copper foil of Example 3.

The optical photomicrographs (50 times and 200 times) of the microporous copper foil 31a of Example 3 are shown in FIGS. 9 and 10. As is clear from FIGS. 9 and 10, the microporous copper foil 31a of Example 3 had large numbers of penetrating pores having uniform sizes, with a pore diameter distribution of substantially 150-200 µm. The percentage of perfect penetrating pores free from burrs attached to edge portions was about 20%. The microporous copper foil 31a had light transmittance of 5%.

Example 4

A microporous copper foil 31a was produced in the same manner as in Example 1, except for changing (1) the pressing force to 133 kgf/cm, (2) the speed of supplying the copper foil 31 to 0.5 m/second, and (3) the frequency of vibration given to the hard roll 2 to 40 Hz. A used hard plastic film 32' and a used soft plastic film 33' were peeled from the as-formed microporous copper foil 31a, which passed a gap between both rolls 1, 2. The resultant microporous copper foil 31a was free from defects such as breakage, wrinkles, etc.

Figure 11:
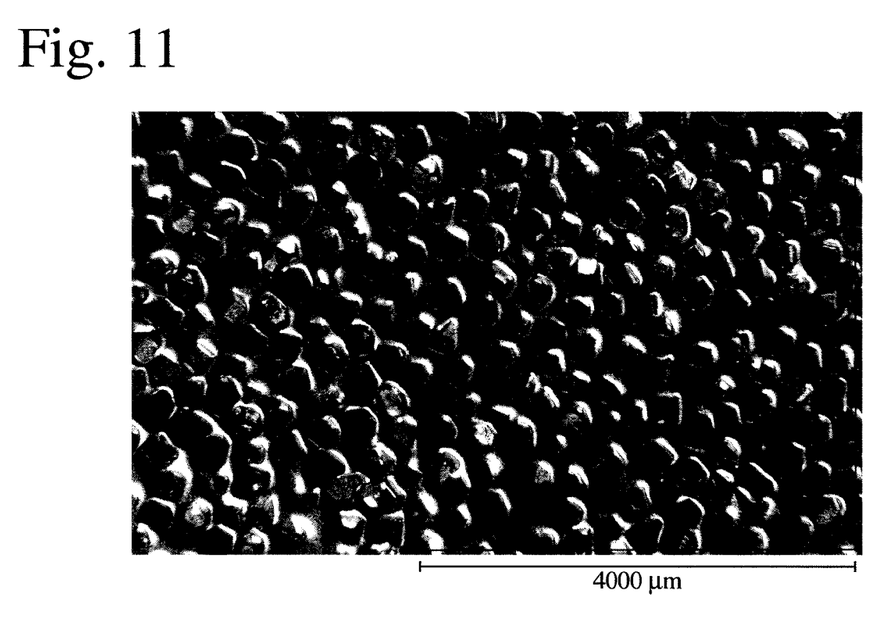
FIG. 11 is an optical photomicrograph (50 times) of the microporous copper foil of Example 4.
Figure 12:
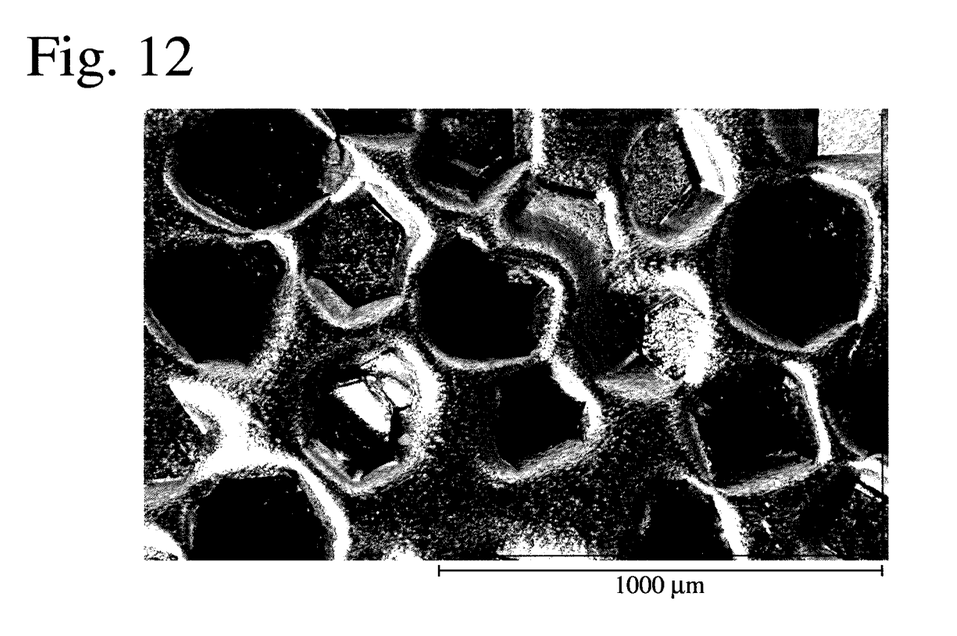
FIG. 12 is an optical photomicrograph (200 times) of the microporous copper foil of Example 4.
Figure 13:
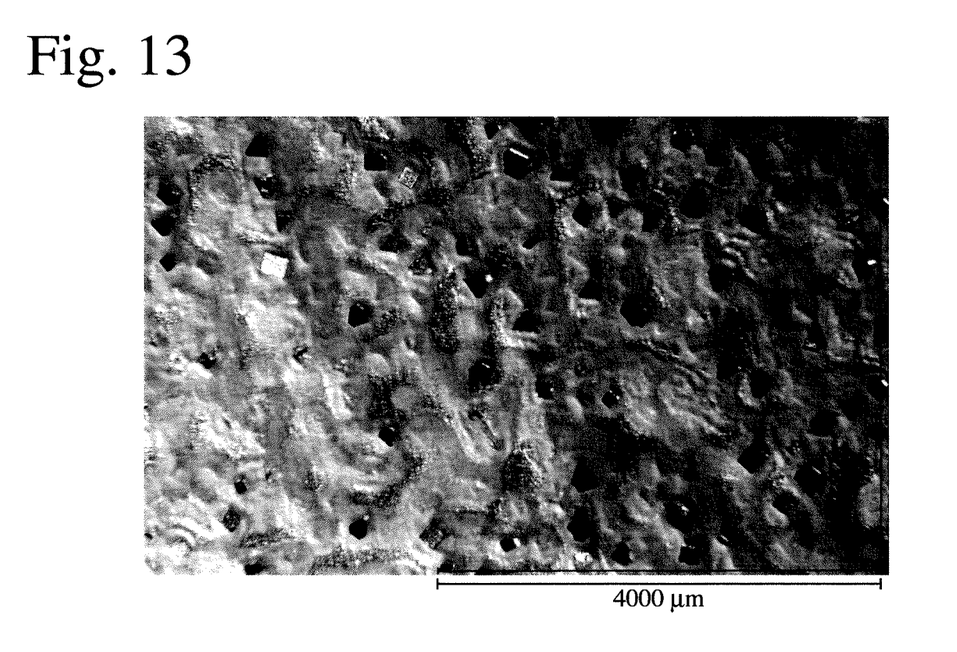
FIG. 13 is an optical photomicrograph (50 times) of the used soft plastic film of Example 4.

The optical photomicrographs (50 times and 200 times) of the microporous copper foil 31a of Example 4 are shown in FIGS. 11 and 12, and the optical photomicrograph (50 times) of the used soft plastic film 33' is shown in FIG. 13. As is clear from FIGS. 11 and 12, the microporous copper foil 31a of Example 4 had large numbers of penetrating pores having uniform sizes, with a pore diameter distribution of substantially 150-200 µm. The percentage of perfect penetrating pores free from burrs attached to edge portions was about 20% or more. The microporous copper foil 31a had light transmittance of 5%.

As is clear from FIG. 13, large numbers of cut pieces of the copper foil 31 generated by forming the penetrating pores were attached to the used soft plastic film 33'. This indicates that many cut pieces of the copper foil 31 generated by forming the penetrating pores are trapped by the soft plastic film 33.

Example 5

A microporous Al foil 31a was produced in the same manner as in Example 1, except that a 12-µm-thick PET film free from a vapor-deposited Al layer was used as the hard plastic film 32. A used hard plastic film 32' and a used soft plastic film 33' were peeled from the as-formed microporous Al foil 31a, which passed a gap between both rolls 1, 2. The resultant microporous Al foil 31a was free from defects such as breakage, wrinkles, etc. Optical-microscopic observation revealed that the microporous Al foil 31a had large numbers of penetrating pores having uniform sizes, with a pore diameter distribution of substantially 150-200 µm. The percentage of perfect penetrating pores free from burrs attached to edge portions was about 10%. The microporous Al foil 31a had light transmittance of 2%.

Example 6

A microporous Al foil 31a was produced in the same manner as in Example 1, except that a 100-µm-thick, single-layer HDPE film was used as the soft plastic film 33. A used hard plastic film 32' and a used soft plastic film 33' were peeled from the as-formed microporous Al foil 31a, which passed a gap between both rolls 1, 2. The resultant microporous Al foil 31a was free from defects such as breakage, wrinkles, etc. Optical-microscopic observation revealed that the microporous Al foil 31a had large numbers of penetrating pores having uniform sizes, with a pore diameter distribution of substantially 150-200 µm. The percentage of perfect penetrating pores free from burrs attached to edge portions was about 10%. The microporous Al foil 31a had light transmittance of 2%.

Example 7

A microporous Al foil 31a was produced in the same manner as in Example 1, except that a 20-µm-thick, Al-deposited, biaxially oriented polypropylene (OPP) film was used as the hard plastic film 32. A used hard plastic film 32' and a used soft plastic film 33' were peeled from the as-formed microporous Al foil 31a, which passed a gap between both rolls 1, 2. The resultant microporous Al foil 31a was free from defects such as breakage, wrinkles, etc. Optical-microscopic observation revealed that the microporous Al foil 31a had large numbers of penetrating pores having uniform sizes, with a pore diameter distribution of substantially 150-200 µm. The percentage of perfect penetrating pores free from burrs attached to edge portions was about 10%. The microporous Al foil 31a had light transmittance of 3%.

Example 8

A microporous Al foil 31a was produced in the same manner as in Example 1, except that a 200-µm-thick low-density polyethylene (LDPE) film was used as the soft plastic film 33. A used hard plastic film 32' and a used soft plastic film 33' were peeled from the as-formed microporous Al foil 31a, which passed a gap between both rolls 1, 2. The resultant microporous Al foil 31a was free from defects such as breakage, wrinkles, etc. Optical-microscopic observation revealed that the microporous Al foil 31a had large numbers of penetrating pores having uniform sizes, with a pore diameter distribution of substantially 150-200 µm. The percentage of perfect penetrating pores free from burrs attached to edge portions was about 15%. The microporous Al foil 31a had light transmittance of 3%.

Reference Example 1

The microporous aluminum foil of Example 1 was coated with a positive electrode material for lithium-ion batteries on both surfaces, dried at 120° C., and then roll-pressed. The positive electrode material had a composition comprising 100 parts by mass of lithium nickel cobalt manganese oxide (NCM) as an active material, 3 parts by mass of acetylene black (HS-100 available from Denki Kagaku Kogyo K. K.) as a conductive agent 1, 3 parts by mass of graphite powder (KS6L available from Timcal) as a conductive agent 2, 3 parts by mass of polyvinylidene fluoride PVDF as a binder, and 61 parts by mass of N-methyl-2-pyrrolidone as a solvent. Microscopic observation revealed that the penetrating pores were filled with the positive electrode material. This indicates that microporous aluminum foils produced by the present invention are suitable for current collectors in lithium-ion batteries.

Effects of the Invention

In the present invention, because a metal foil passes through the gap between a pattern roll having large numbers of high-hardness, fine particles on the surface and a hard roll while pressing, to provide the metal foil with large numbers of fine penetrating pores, with a thin hard plastic film interposed between the metal foil and the pattern roll, and a thick soft plastic film interposed between the metal foil and the hard roll, (a) fine penetrating pores can be formed at high density in the metal foil without wrinkling and breakage; (b) the percentage of penetrating pores free from burrs attached to edge portions is high among all penetrating pores formed; and (c) most of fine cut metal foil pieces generated by forming fine penetrating pores can be trapped by the soft plastic film. Accordingly, a metal foil having fine penetrating pores at high density can be produced efficiently at low cost. Microporous metal foils produced by the present invention are suitable for current collectors in lithium-ion batteries, lithium-ion capacitors, electric double-layer capacitors, etc.

DESCRIPTION OF REFERENCE NUMERALS

1: Pattern roll.
1a: Pattern roll body.

1b: Plating layer of pattern roll.
2: Hard roll.
3-8: First to sixth reels.
10: High-hardness, fine particles.
13, 14, 15: First to third guide rolls.
16: Buffing roll.
17, 18: Pressing roll.
21, 22, 27, 28: Bearings.
30: Frame of pore-forming apparatus.
31: Metal foil.
31a: As-formed microporous metal foil.
31b: Buffed microporous metal foil.
31c: Pressed microporous metal foil.
32: Hard plastic film.
32': Used hard plastic film.
33: Soft plastic film.
33': Used soft plastic film.
42: Vibration motor.
44, 46: Driving means.

What is claimed is:

1. A method for producing a microporous metal foil comprising
passing a metal foil through a gap between a pattern roll having large numbers of high-hardness, fine particles on the surface and a hard roll while pressing, such that said high-hardness, fine particles penetrate through said metal foil to provide said metal foil with large numbers of fine penetrating pores, with a thin hard plastic film interposed between said metal foil and said pattern roll, and a soft plastic film thicker than said hard plastic film interposed between said metal foil and said hard roll; and
adjusting tension applied to each of said metal foil, said hard plastic film and said soft plastic film to such an equal level that said metal foil is not broken during forming said fine penetrating pores.

2. The method for producing a microporous metal foil according to claim 1, wherein said metal foil is an aluminum or copper foil.

3. The method for producing a microporous metal foil according to claim 1, wherein said hard plastic film has a thin metal film on the side of said metal foil.

4. The method for producing a microporous metal foil according to claim 1, wherein said soft plastic film is a composite film comprising a soft resin layer attached to a base film having high tensile strength and hardness.

5. The method for producing a microporous metal foil according to claim 1, wherein mechanical vibration is applied to at least one of said pattern roll and said hard roll during forming pores in said metal foil.

6. The method for producing a microporous metal foil according to claim 1, wherein said microporous metal foil is brought into sliding contact with a buffing roll having such softness as not to break said microporous metal foil, to remove cut metal foil pieces remaining in edge portions of fine penetrating pores.

7. The method for producing a microporous metal foil according to claim 1, wherein said microporous metal foil is provided with a flat surface by pressing.

8. The method for producing a microporous metal foil according to claim 1, wherein said soft plastic film has (a) such softness and thickness that said high-hardness, fine particles penetrating through said hard plastic film and said metal foil can enter or intrude; and (b) such strength and hardness that a pressing force necessary for said high-hardness, fine particles to penetrate through said metal foil can be transmitted from said hard roll.

9. An apparatus for producing a microporous metal foil comprising
a pore-forming apparatus comprising a pattern roll having large numbers of high-hardness, fine particles on the surface, and a hard roll opposing said pattern roll via a gap;
a first guide means for passing a metal foil through the gap between said pattern roll and said hard roll;
a second guide means for passing a thin hard plastic film through the gap between said pattern roll and said metal foil; and
a third guide means for passing a thicker soft plastic film than said hard plastic film through the gap between said hard roll and said metal foil;
each of said first to third guide means being provided with a means for adjusting tension applied to each of said metal foil, said hard plastic film and said soft plastic film, to such an equal level that said metal foil is not broken during forming said fine penetrating pores;
whereby said hard plastic film, said metal foil and said soft plastic film are overlapped in this order from the side of said pattern roll, and pass through the gap between said pattern roll and said hard roll, such that said high-hardness, fine particles penetrate through said metal foil to form a microporous metal foil having fine penetrating pores.

10. The apparatus for producing a microporous metal foil according to claim 9, wherein a vibration motor is mounted to a bearing of at least one of said pattern roll and said hard roll, to give mechanical vibration to at least one of said pattern roll and said hard roll during forming said pores in said metal foil.

11. The apparatus for producing a microporous metal foil according to claim 9, wherein a buffing roll is arranged downstream of said pore-forming apparatus, and brought into sliding contact with said microporous metal foil to remove cut metal foil pieces remaining in edge portions of fine penetrating pores.

12. The apparatus for producing a microporous metal foil according to claim 9, wherein a pair of smooth-surfaced pressing rolls are arranged downstream of said pore-forming apparatus to press said microporous metal foil to provide it with a flat surface.

13. The apparatus for producing a microporous metal foil according to claim 9, wherein said soft plastic film has (a) such softness and thickness that said high-hardness, fine particles penetrating through said hard plastic film and said metal foil can enter or intrude; and (b) such strength and hardness that a pressing force necessary for said high-hardness, fine particles to penetrate through said metal foil can be transmitted from said hard roll.

* * * * *